United States Patent
Brown et al.

(12)

(10) Patent No.: US 6,827,958 B2
(45) Date of Patent: Dec. 7, 2004

(54) TOASTER PASTRY

(75) Inventors: Mary Brown, Toronto (CA); Amanda Mitchell-Hanna, Toronto (CA); Derry-Anne Perog, Toronto (CA); Sandra Zabarchuk, Toronto (CA); Harinder Shah, Mississauga (CA)

(73) Assignee: Morrison Lamothe Inc., Toronto ( * ) Notice: Subject to any disclaimer, the term of this patent is extended or adjusted under 35 U.S.C. 154(b) by 77 days.

(21) Appl. No.: 10/026,652

(22) Filed: Dec. 27, 2001

(65) Prior Publication Data

US 2003/0124227 A1 Jul. 3, 2003

(51) Int. Cl.$^7$ .............................................. A21D 13/00
(52) U.S. Cl. .................. 426/94; 426/283; 426/439; 426/496; 426/549; 426/556
(58) Field of Search ................. 426/283, 556, 426/43, 94, 496, 549, 572

(56) References Cited

U.S. PATENT DOCUMENTS 4,517,203 A * 5/1985 Levine et al. ................. 426/19
4,562,080 A * 12/1985 Tenn ............................ 426/94

FOREIGN PATENT DOCUMENTS

CA        1248406        1/1989

* cited by examiner

*Primary Examiner*—Lien Tran
(74) *Attorney, Agent, or Firm*—Sim & McBurney

(57) ABSTRACT

A dough and a filling for making a toaster pastry and a method for making same. A method of forming the dough for the toaster pastry, comprises forming a blend of ingredients comprising wheat flour of from about 25 to about 44% by weight of ingredients for the dough, wheat farina of from about 13 to about 35% by weight of ingredients for the dough, shortening of from about 1.5 to about 2.5% by weight of ingredients for the dough, and water of from about 25 to about 35% by weight of ingredients for the dough; adding puff pastry shortening in the form of cubes such that the amount of puff pastry shortening is in the range of from about 5 to about 15% by weight of the ingredients for the pastry; and blending the ingredients such that a heterogeneous mixture of the cubes of shortening in the remainder of the ingredients is obtained. In a preferred aspect, the method further comprises forming the dough into a layered structure, the layered structure comprising a single base sheet of the dough covered with a pastry filling, with a single top sheet of the pastry blend of the dough applied thereover.

36 Claims, No Drawings

TOASTER PASTRY

FIELD OF THE INVENTION

The present invention relates to a toaster pastry. In particular, the present invention relates to a dough and filling for a toaster pastry and the method for making same.

BACKGROUND OF THE INVENTION

Toaster pastry products are known in the food industry, and some examples are known as strudels. The products may be prepared with a wide variety of fruit fillings, for example, apple, cherry, strawberry, blueberry, wild berry and the like.

The development of commercially-acceptable toaster pastry products poses a number of technical problems in preparation, storage and stability. Such problems are discussed in Canadian Patent 1 248 406 of Wallin et al.

A toaster pastry requires both a high flavor and storage stability. One method of developing a high flavor is to use a high moisture content product with a large quantity of interior filling. Although this might be expected to maximize the flavor of the product, it will cause problems in the stability of the product. A large quantity of filling means that there is a relatively large area of contact between the filling and the interior surface of the dough of the pastry. Migration of moisture from the high-moisture content filling to the dough causes sogginess in the dough. In addition, acid migration from the filling, especially a fruit filling, to the dough results in a decrease in acidity of the filling, as well as color changes in the filling. Both the dough and filling lose flavor and there is a degradation of structural integrity of the product.

It would, therefore, be expected that use of low moisture content fillings would tend to overcome these problems. However, the result is a product with a low flavor impact and poor feel in the mouth of the consumer.

Canadian Patent 1 248 406 disclosed a high moisture content, shelf stable and product stable filling for toaster pastries. The filling had (a) a viscosity of from about 20,000 cps to about 60,000 cps; (b) a starch content of from about 3.5% by weight to about 8% by weight; (c) a gum content of from about 0.15% by weight to about 0.4% by weight; (d) a pH of from about 2.8 to about 7.5 and (e) a total moisture content of from about 30 to about 50% by weight. The filling was used with a high moisture laminated dough pad and roll-in shortening pad to provide the toaster pastry, which was cooked and then frozen. The toaster pastry may be thawed and then toasted or toasted directly from a frozen state to provide both a flaky, delamination resistant exterior surface and a bready, well developed interior structure that is stable at its moist interior surface with respect to contact with the filling. The high moisture laminated mixed dough and roll-in shortening pad had from about 2 to about 12 substantially discreet and continuous roll-in shortening layers per millimeter of pad thickness. The mixed dough was of from about 45 to about 60% by weight of flour and of from about 4 to about 20% by weight of shortening.

Notwithstanding the procedures set forth in Canadian Patent 1 248 406, further and improved techniques for the manufacture of toaster pastries are required, especially to simplify the procedures required in the manufacture of the toaster pastries, and to provide an equivalent or improved taste to the product that is obtained.

SUMMARY OF THE INVENTION

According to an aspect of the present invention, there is provided an alternative dough, filling and method for the manufacture of toaster pastries. In a preferred aspect of the present invention, the toaster pastry is of a type that is laminated dough with an interior filling.

According to another aspect of the present invention, the toaster pastry is prepared and then fried, packaged and frozen by a manufacturer prior to sale to a consumer. The consumer toasts the pastry in the thawed or frozen state.

According to yet another aspect of the present invention, the combination of a filling formulation of this invention and a dough formulation of this invention provides a toaster pastry product of good quality and stability.

According to yet another aspect of the present invention, there is provided a method of forming a dough for a toaster pastry, the method comprising forming a blend of ingredients comprising wheat flour of from about 25 to about 44% by weight of ingredients for the dough, wheat farina of from about 13 to about 35% by weight of ingredients for the dough, shortening of from about 1.5 to about 2.5% by weight of ingredients for the dough, and water of from about 25 to about 35% by weight of ingredients for the dough; adding puff pastry shortening in the form of cubes such that the amount of puff pastry shortening is in the range of from about 5 to about 15% by weight of the ingredients for the pastry; and blending the ingredients such that a heterogeneous mixture of the cubes of shortening in the remainder of the ingredients is obtained. In a preferred aspect, the method further comprises forming the dough into a layered structure, the layered structure comprising a single base sheet of the dough covered with a pastry filling, with a single top sheet of the pastry blend of the dough applied thereover.

According to still another aspect of the present invention, there is provided a toaster pastry made according to the above method, the toaster pastry comprising an upper layer of dough, a lower layer of dough and an intermediate layer of filling, said pastry when cooked providing a flaky, multi-layered filled pastry.

According to another aspect of the present invention, there is provided a method of forming a dough for a toaster pastry, comprising the steps of:

(a) forming a blend of ingredients comprising wheat flour of from about 25 to about 35% by weight of ingredients for the dough, sugar to taste and shortening of from about 1.5 to about 2.5% by weight of the ingredients for the dough;

(b) adding wheat farina of from about 20 to about 35% by weight of the ingredients for the dough;

(c) mixing modified starch of from about 1 to about 1.5% by weight of the ingredients for the dough, baking powder of from about 0.3 to about 1.2% by weight of the ingredients for the dough, salt to taste, a reducing agent of from about 0.015 to about 0.025% by weight of the ingredients for the dough, dextrose of from about 0.25 to about 0.75% by weight of the ingredients for the dough, and dried egg yolk of from about 0.8 to about 1.3% by weight of the ingredients for the dough, with the ingredients of (b);

(d) mixing yeast of from about 0.3 to about 1.5% by weight of the ingredients for the dough, and water of from about 25 to about 35% by weight of the ingredients for the dough, with the ingredients of (c);

(e) adding puff pastry shortening in the form of cubes such that the amount of puff pastry shortening is in the range of from about 5 to about 15% by weight of the ingredients for the dough; and (f) blending the ingredients of (e) such that a heterogeneous mixture of the cubes of shortening in the remainder of said ingredients is obtained.

According to still another aspect of the invention there is provided a dough for a toaster pastry comprising wheat flour of from about 25 to about 44% by weight of ingredients for the dough, wheat farina of from about 13 to about 35% by weight of ingredients for the dough, shortening of from about 1.5 to about 2.5% by weight of ingredients for the dough, water of from about 25 to about 35% by weight of ingredients for the dough and puff pastry shortening, in the form of cubes, of from about 5 to about 15% by weight of the ingredients for the pastry.

According to yet another aspect of the present invention, there is provided a filling comprising fruit of from about 1 to about 50% by weight of ingredients of the filling; water of from about 20 to about 50% by weight of ingredients of the filling; a sweetener of from about 20 to about 40% by weight of ingredients of the filling; corn syrup of from about 6 to about 20% by weight of ingredients of the filling; modified starch of from about 4 to 7% by weight of ingredients of the filling; a gum of from about 0.3% to about 0.7% by weight of ingredients of the filling; and an acid of from about 0.3% to about 0.7% by weight of ingredients of the filling.

DETAILED DESCRIPTION OF THE INVENTION

The present invention relates to a dough and filling for a toaster pastry and the method for making same.

The manufacture of the toaster pastry may involve forming a dough into single top and bottom layers. A filling is placed between the single layers, after which the resultant layered structure may be crimped and cut to form the individual toaster pastries. The toaster pastries are then typically fried, frozen and packaged prior to sale to a consumer. The consumer opens the packaged toaster pastry, and typically heats the toaster pastry in a toaster to obtain a flaky toaster pastry. The toaster pastry may be toasted in a frozen or thawed state.

As discussed above, the combination of dough and filling preferably exhibit stability during storage prior to use. For instance, the pastry retains its integrity without becoming soggy or unduly moist, and without discoloration by the filling. Preferably, the toasted pastry exhibits a flakiness that is acceptable to the consumer, and not be too hard, too soft, or soggy, and the filling remains moist, with acceptable taste and mouth feel to the consumer.

It is understood that the ingredients used in the method described herein may be varied in both type and amount.

In general, the method for manufacturing a dough for the toaster pastry typically comprises forming a blended mixture of wheat flour, wheat farina (wheat farina is also known as wheatlets and is defined as the fine granular product derived from purified endosperm of hard wheat), shortening and water. A puff pastry shortening, in cubed form, is added to the blended mixture and mixed such that a heterogeneous mixture is obtained wherein the cubed shortening remains separated, at least in part. Optional ingredients may be added such as sugars, salt, flavors, coloring, starches, baking powder, reducing agents (ie. L-cysteine), dried egg yolk, and yeast.

In preferred embodiments, the method of making a dough for a toaster pastry comprises mixing wheat flour, sugar and shortening together in a mixer. Any suitable mixer may be used. Preferably, the mixer is a twin arm mixer, a horizontal double sigma arm mixer or the like.

The amount of flour may be varied, but is typically in an amount from about 25 to about 44% by weight, especially of from about 25 to about 31% by weight, of the ingredients for the dough. Preferably, the flour has a protein content of at least about 10% by weight of the flour, such as a moderately strong hard wheat flour, especially an all purpose flour. The strength of the flour refers to the protein content of the flour and moderately strong is defined as having a protein content of about 9 to about 15% by weight of the flour. Preferably, the protein content of the flour used in the dough ranges from about 10.5 to about 12.5% by weight of the flour, and especially from about 11.0 to about 12.0%. The flour may be bleached, may be treated with maturing agents such as ascorbic acid, and/or may contain added amylase enzyme and nutrient enrichment additives.

The amount of sugar is variable, depending on the tastes desired by the consumers. Typical amounts of sugar are of from about 1.0 to about 3.5% by weight of the ingredients for the dough. More preferably, the amount of sugar is of from about 1.6 to about 2.2% by weight of the ingredients for the dough.

The shortening is a kind typically used in bakery applications, such as an all purpose vegetable shortening made from hydrogenated vegetable oils such as soybean, canola, corn, cottonseed, sunflower, palm and the like. These shortenings are preferably designed to be absorbed into the dough. The amount of shortening is preferably of from about 1.5 to about 2.5% by weight, and more preferably of from about 1.6 to about 2.0% by weight of the ingredients for the dough.

The mixture of wheat flour, sugar and shortening is mixed to a uniform consistency. The time required will vary, but is typically of from about 2 to about 5 minutes.

Wheat farina, also known as wheatlets, is then added to the mixture. The protein content of wheat farina typically ranges from about 10.0 to 11.5% by weight of the wheat farina. Preferably, the granulation of wheat farina is controlled so that no more than about 20% by weight of endosperm particles are larger than about 250 microns, about 70 to 85% by weight of the endosperm particles vary in size from about 149 microns to about 250 microns and no more than about 12% by weight of endosperm particles are smaller than about 149 microns. The amount of wheat farina is preferably of from about 13 to about 35% by weight of the ingredients for the dough, more preferably from about 26 to about 29% by weight of the ingredients for the dough. The wheat farina may be mixed in with the wheat flour, sugar and shortening.

At this stage of the method, however, a number of other ingredients are added, either separately or preferably in the form of a pre-blended mixture. Such other ingredients typically include modified starches (ie. cornstarch) preferably in amounts of from about 1 to about 1.6% by weight of the ingredients for the dough, more preferably from about 1.2 to about 1.4% by weight; baking powder preferably in amounts of from about 0.3 to about 1.2% by weight of the ingredients for the dough, more preferably from about 0.4 to about 0.9% by weight; salt preferably in amounts of from about 0.75 to about 1.5% by weight of the ingredients for the dough, more preferably from about 0.8 to about 1.0% by weight; a reducing agent (ie. L-cysteine) preferably in amounts of from about 0.015 to about 0.025% by weight of the ingredients for the dough, more preferably from about 0.018 to about 0.022% by weight; dextrose preferably in amounts of from about 0.25 to about 0.75% by weight of the ingredients for the dough, more preferably from about 0.40 to about 0.60% by weight; and dried egg yolk preferably in amounts of from about 0.8 to about 1.3% by weight of the ingredients for the dough, more preferably from about 0.9 to about 1.1% by weight.

The resultant mixture is mixed to a uniform consistency in the mixer, for example, for about 2 to about 5 minutes, depending on the mixer.

The blended mixture is then mixed with yeast, coloring and water. The amount of yeast is preferably of from about 0.3 to about 1.5% by weight of the ingredients. The yeast may be chosen from dry instant yeast or fresh bakers yeast. With respect to the dry instant yeast, preferably from about 0.3 to about 0.6% by weight of the ingredients is used, more preferably, from about 0.4 to about 0.5% by weight of the ingredients. The amount of coloring may be varied according to consumer preferences. The amount of water is preferably from about 25 to about 35% by weight of dough ingredients and more preferably from about 26 to about 30% by weight. The mixture so obtained is further mixed.

It is understood that such ingredients may be varied both in type and in amount, as will be understood with respect to the manufacture of pastry dough.

The flaky structure of the final product is achieved by mixing the mixture resulting from the above recited steps with a typical puff pastry shortening in a cubed form. Preferably, such cubes measure no greater than about 8 cm$^3$ and especially measure about 5 cm$^3$. Preferably, the puff pastry shortening is made from hydrogenated vegetable oils such as soybean, canola, palm and the like. In preferred embodiments, these fats contain a relatively high amount of solid fat, which form thin continuous layers to serve as film-like separations between dough sheets. A flaky texture results when the heat during frying changes water in the dough to steam, causing the layers to puff. The cubed puff pastry shortening is mixed into the mixture obtained above preferably in amounts of from about 5 to about 15% by weight of the ingredients for the dough, more preferably from about 6 to about 10% by weight and, in particular, from about 7 to about 8% by weight.

The cubed shortening is mixed with the mixture previously prepared so that the cubes of shortening remain visible. While the cubes should be substantially uniformly distributed within the mixture, it is important that the mixture remain as a heterogeneous mixture with the cubed shortening remaining separate, at least in part. Thus, a homogeneous mixture of the shortening in the pastry mix is neither sought nor obtained. The size and distribution of the cubed shortening, which relate to the original size of the cubes and the degree of mixing, affect the flakiness of the resultant product. The final temperature of the resultant mixture is such that the resultant mixture remains heterogeneous. More preferably, the final temperature of the resultant mixture does not exceed about 25° C. Most preferably, the final temperature does not exceed 20° C. In preferred embodiments, the temperature may be controlled by refrigerating the mixing bowl.

In a preferred embodiment of the invention, the method comprises the additional steps of forming the dough into a layered structure. The dough is formed into single top and bottom layers using a sheeter such as a Rondo Doge™ sheeter or similar equipment. A filling is placed between the single layers, after which the resultant layered structure is crimped and cut to form the individual toaster pastries. The toaster pastries are then typically fried, preferably, in a deep frying shortening, such as a pourable frying shortening. The toaster pastries are then frozen and packaged prior to sale to a consumer. The toaster pastries exhibit a multi-layered, and hence flaky characteristic, after heating in a toaster.

Fillings used in the toaster pastry of the present invention may be chosen from a wide variety of pastry fillings such as fillings comprising sweeteners, water, viscosifiers, such as starches and gums, flavors, acidulants, preservatives and colorants. Some examples of pastry fillings that may be used are fruit, cheese, chocolate, pizza, egg and the like. The properties of the fillings used in the toaster pastry are preferably such that the interaction between the dough and the filling is minimal to maintain good product quality and stability. The filling used in the toaster pastry may be a fruit filling selected from the group consisting of cherry, strawberry, mixed berry, apple and the like. Preferably, the fruit filling has a viscosity of at least about 62,000 cps (Brookfield RVDV1, Spindle No. 7, 50 rpm at 21° C.) and a pH of from about 2.8 to 3.2. In preferred embodiments, the filling comprises fruit of from about 1 to about 50% by weight of ingredients of the filling; water of from about 20 to about 50% by weight of ingredients of the filling; a sweetener of from about 20 to about 40% by weight of ingredients of the filling; corn syrup of from about 6 to about 20% by weight of ingredients of the filling; modified starch of from about 4 to 7% by weight of ingredients of the filling; a gum of from about 0.3% to about 0.7% by weight of ingredients of the filling; and an acid of from about 0.3% to about 0.7% by weight of ingredients of the filling. Optional ingredients such as flavors, preservatives, salt, hydrogenated vegetable oil and coloring may be included. Preferably, the fruit is selected from the group consisting of fresh fruit, frozen fruit, dehydrated fruit, dehydrated fruit powder and mixtures thereof. Preferably, the sweetener is selected from the group consisting of sugar, high fructose corn syrup, fructose solids, invert sugars and mixtures thereof. Preferably, the corn syrup may comprise corn syrup and/or corn syrup solids and/or glucose solids or mixtures thereof. The modified starch may be any starch, such as corn starch. Preferably, the gum is selected from the group consisting of agar-agar, locust bean gum, guar gum, xanthan gum, alginates, carageenan gum and mixtures thereof. Preferably, the acid is selected from the group consisting of citric acid, malic acid, lactic acid, tartaric acid, adipic acid, acetic acid and mixtures thereof. More preferably, the acid is selected from the group consisting of citric acid, malic acid and mixtures thereof.

The above disclosure generally describes the present invention. A more complete understanding can be obtained by reference to the following specific Examples. These Examples are described solely for purposes of illustration and are not intended to limit the scope of the invention. Changes in form and substitution of equivalents are contemplated as circumstances may suggest or render expedient. Although specific terms have been employed herein, such terms are intended in a descriptive sense and not for purposes of limitation.

EXAMPLE 1

A series of flavored fillings were prepared. All fillings had a viscosity of at least 62,000 cps. and a pH of between 2.8 to 3.2.

A typical fruit flavored filling comprised water, sugar, fruit, corn syrup, modified starch, citric and/or other acids, gum such as agar-agar, stabilizers, flavors, and optionally preservatives, salt, hydrogenated vegetable oil and coloring. An example of a filling is a strawberry filling comprising 14.9% fruit, 34.0% water, 29.8% sugar, 13.5% corn syrup, 5.7% modified starch, 0.54% agar-agar, and 0.59% acids. The pH of the filling was measured and found to be 3.0. The viscosity was 64,000 cps, measured on a Brookfield Viscometer RVDV1, No. 7 spindle, 50 rpm at 21° C.

Another example of a filling is a cherry filling comprising 17.7% fruit, 34.2% water, 28.5% sugar, 11.8% corn syrup, 6.3% modified starch, 0.55% agar-agar, and 0.55% acids. The pH of the filling was measured and found to be 3.1. The viscosity was 64,000 cps, measured on a Brookfield Viscometer RVDV1, No. 7 spindle, 50 rpm at 21° C.

EXAMPLE 2

A dough for a toaster pastry was prepared. All percentages are by weight of the final dough mixture.

A mixture of a medium strength, bleached, enriched hard wheat flour (29.5% by weight of the ingredients), with a protein content of 11.0 to 12.0% by weight of the wheat flour; sugar (2.13% by weight of the ingredients); and all purpose shortening (1.71% by weight of the ingredients) were blended in a horizontal double sigma arm mixer for 3 minutes. Wheat farina (26.55% by weight of the ingredients) was added to the mixture, together with a pre-blended mixture of cornstarch (1.28% by weight of the ingredients), baking powder (0.92% by weight of the ingredients), salt (0.87% by weight of the ingredients), L-cysteine (0.02% by weight of the ingredients), dextrose (0.50% by weight of the ingredients) and dried egg yolk (1.03% by weight of the ingredients). The resultant mixture was blended in the mixer for a further 3 minutes.

A pre-blended mixture of dry instant yeast (0.43% by weight of the ingredients), coloring (0.5% by weight of the ingredients) and water (27.40% by weight of the ingredients) were then added, and the resultant mixture was mixed for a further 3 minutes.

A cubed puff pastry shortening (7.6% by weight of the ingredients) was added to the mixer, and mixed for a further 1.5 minutes. The mixing did not result in a blending of the cubed shortening. Chunks of the cubed shortening were still visible.

To form the toaster pastry, a single bottom sheet of the dough was formed using a sheeter, having a thickness of 2.2 mm. Water was sprayed along the edges of the dough sheet. The strawberry filling of Example 1 was deposited continuously and/or intermittently onto the bottom dough sheet, and spread evenly to cover the bottom dough sheet. A single top sheet of the dough was then placed over the filling. The resultant layered structure was crimped along all four edges and cut to form toaster pastries. The resultant toaster pastries were fried in a liquid frying shortening at 195° C. for 60 to 65 seconds and then frozen.

The resultant frozen toaster pastries may be packed for sale.

Toaster Pastry Tests for the Examples

Subsequent testing of the toaster pastry product revealed acceptable stability, good structural integrity, no seam leakage and an attractive appearance. Organoleptic testing of the pastry and filling showed that the pastry falls apart and is flaky, and with respect to visual analysis, there are many discrete layers. The pastry with filling is layered, flaky and aerated. In organoleptic testing using a panel of potential customers, it was found that the potential customers preferred the pastry and filling of the present invention over a competitive product.

Taste testing of toaster pastries that were less than one week old when toasted showed acceptable taste and mouth feel when eaten. Moreover, such tests were repeated on toaster pastries that had been stored in a sealed frozen condition for periods of up to twelve months. After toasting, the toaster pastries continued to exhibit acceptable taste and mouth feel when eaten.

Although preferred embodiments of the invention have been described herein in detail, it will be understood by those skilled in the art that variations may be made thereto without departing from the spirit of the invention.

What is claimed is:

1. A method of forming a dough for a toaster pastry, the method comprising:
    forming a blend of ingredients comprising wheat flour of from about 25 to about 44% by weight of ingredients for the dough, wheat farina of from about 13 to about 35% by weight of ingredients for the dough, shortening of from about 1.5 to about 2.5% by weight of ingredients for the dough, and water of from about 25 to about 35% by weight of ingredients for the dough;
    adding puff pastry shortening in the form of cubes to said blend of ingredients such that the amount of puff pastry shortening is in the range of from about 5 to about 15% by weight of ingredients for the dough; and
    blending the cubes of said puff pastry shortening and said blend of ingredients to form a dough which is a heterogeneous mixture of the cubes of said puff pastry shortening in said blend of ingredients.

2. The method of claim 1, wherein the wheat flour is of from about 25 to about 31% by weight of ingredients for the dough.

3. The method of claim 1, wherein the wheat flour comprises a protein content of at least about 10% by weight of the wheat flour.

4. The method of claim 3, wherein the protein content is of from about 10.5 to about 12.5% by weight of the wheat flour.

5. The method of claim 1, wherein the wheat flour is an all purpose wheat flour.

6. The method of claim 1, wherein the wheat flour is a moderately strong hard wheat flour.

7. The method of claim 1, wherein the shortening is of from about 1.6 to about 2.0% by weight of ingredients for the dough.

8. The method of claim 1, wherein the shortening is an all purpose vegetable shortening.

9. The method of claim 1, wherein the wheat farina is of from about 26 to about 29% by weight of ingredients for the dough.

10. The method of claim 1, wherein the wheat farina comprises a protein content of from about 10 to 11.5% by weight of the wheat farina.

11. The method of claim 1, wherein the wheat farina comprises at most about 20% by weight of endosperm particles having a particle size that is greater than about 250 microns, about 70 to about 85% by weight of the endosperm particles having a particles size of from about 149 microns to about 250 microns, and at most about 12% by weight of endosperm particles having a particle size less than about 149 microns.

12. The method of claim 1, wherein the blend of ingredients further comprises sugar from about 1.0 to about 3.5% by weight of the ingredients for the dough.

13. The method of claim 12, wherein the sugar is of from about 1.6 to about 2.2% by weight of the ingredients for the dough.

14. The method of claim 1, wherein the blend of ingredients further comprises an additional ingredient selected from the group consisting of modified starches, baking powder, salt, a reducing agent, dextrose, dried egg yolk, yeast, coloring and mixtures thereof.

15. The method of claim 1, wherein the blend of ingredients further comprises an additional ingredient selected from the group consisting of modified starches of from about 1 to about 1.6% by weight of the ingredients for the dough, baking powder of from about 0.3 to about 1.2% by weight of the ingredients for the dough, salt of from about 0.75 to about 1.5% by weight, L-cysteine of from about 0.015 to about 0.025% by weight of the ingredients for the dough, dextrose of from about 0.25 to about 0.75% by weight of the ingredients for the dough, dried egg yolk of from about 0.8 to about 1.3% by weight of the ingredients for the dough, yeast of from about 0.3 to about 0.6% by weight of the ingredients for the dough, coloring and mixtures thereof.

16. The method of claim 1, wherein the blend of ingredients further comprises yeast from about 0.3 to about 1.5% by weight of the ingredients for the dough.

17. The method of claim 16, wherein the blend of ingredients further comprises yeast from about 0.3 to about 0.6% by weight of the ingredients for the dough.

18. The method of claim 1, wherein the cubed puffed pastry shortening ranges of from about 6 to about 10% by weight of the ingredients for the dough.

19. The method of claim 18, wherein the cubed puffed pastry shortening ranges of from about 7 to about 8% by weight of the ingredients for the dough.

20. The method of claim 1, wherein the cubes of puffed pastry shortening are at most 8 cm$^3$.

21. The method of claim 20, wherein the cubes of puffed pastry shortening are 5 cm$^3$.

22. The method of claim 1, wherein a final temperature of the dough is suitable to maintain the heterogeneous mixture.

23. The method of claim 22, wherein the final temperature is at most about 25° C.

24. The method of claim 22, wherein the final temperature is at most about 20° C.

25. The method of claim 1 further comprising forming the dough into a layered structure, the layered structure comprising a base sheet of the dough covered with a pastry filling, with a top sheet of the pastry blend of the dough applied thereover.

26. The method of claim 25, wherein the layered structure is crimped and cut to form the toaster pastry.

27. The method of claim 26, wherein the toaster pastry is fried and frozen.

28. The method of claim 25, wherein the filling is selected from the group consisting of cherry, strawberry, mixed berry and apple.

29. A method of forming a dough for a toaster pastry, comprising the steps of:
(a) mixing together wheat flour in an amount of from about 25 to about 35% by weight of ingredients for the dough, sugar to taste and shortening in an amount of from about 1.5 to about 2.5% by weight of ingredients for the dough to form a first blend of ingredients;
(b) adding to said first blend of ingredients wheat farina in an amount of from about 20 to about 35% by weight of ingredients for the dough to form a second blend of ingredients;
(c) mixing with said second blend of ingredients modified starch in an amount of from about 1 to about 1.5% by weight of the ingredients for the dough, baking powder in an amount of from about 0.3 to about 1.2% by weight of ingredients for the dough, salt to taste, a reducing agent in an amount of from about 0.015 to about 0.025% by weight of ingredients for the dough, dextrose in an amount of from about 0.25 to about 0.75% by weight of ingredients for the dough, and dried egg yolk in an amount of from about 0.8 to about 1.3% by weight of ingredients for the dough to form a third blend of ingredients;
(d) mixing with the third blend of ingredients yeast in an amount of from about 0.3 to about 1.5% by weight of ingredients for the dough and water in an amount of from about 25 to about 35% by weight of ingredients for the dough to form a fourth blend of ingredient;
(e) adding puff pastry shortening in the form of cubes to said fourth blend of ingredients such that the amount of puff pastry shortening is in the range of from about 5 to about 15% by weight of ingredients for the dough; and
(f) blending the cubes of puff pastry shortening and said fourth blend of ingredients to form a dough which is a heterogeneous mixture of the cubes of shortening in said fourth blend of ingredients.

30. A dough for a toaster pastry comprising wheat flour of from about 25 to about 44% by weight of ingredients for the dough, wheat farina of from about 13 to about 35% by weight of ingredients for the dough, shortening of from about 1.5 to about 2.5% by weight of ingredients for the dough, water of from about 25 to about 35% by weight of ingredients for the dough and puff pastry shortening, in the form of cubes, of from about 5 to about 15% by weight of the ingredients for the pastry.

31. The dough of claim 30, wherein the wheat flour is of from about 25 to about 31% by weight of ingredients for the dough.

32. The dough of claim 30, wherein the wheat flour is a moderately strong hard wheat flour.

33. The dough of claim 30, wherein the wheat farina is of from about 26 to about 29% by weight of ingredients for the dough.

34. The dough of claim 30 further comprises an additional ingredient selected from the group consisting of sugars, modified starches, baking powder, salt, a reducing agent, dextrose, dried egg yolk, yeast, coloring and mixtures thereof.

35. The dough of claim 30, wherein the cubes of puffed pastry shortening are at most 8 cm$^3$.

36. A toaster pastry made according to the method of claim 25, the toaster pastry comprising an upper layer of dough, a lower layer of dough and an intermediate layer of filling, said pastry when cooked providing a flaky, multi-layered filled pastry.

* * * * *